UNITED STATES PATENT OFFICE.

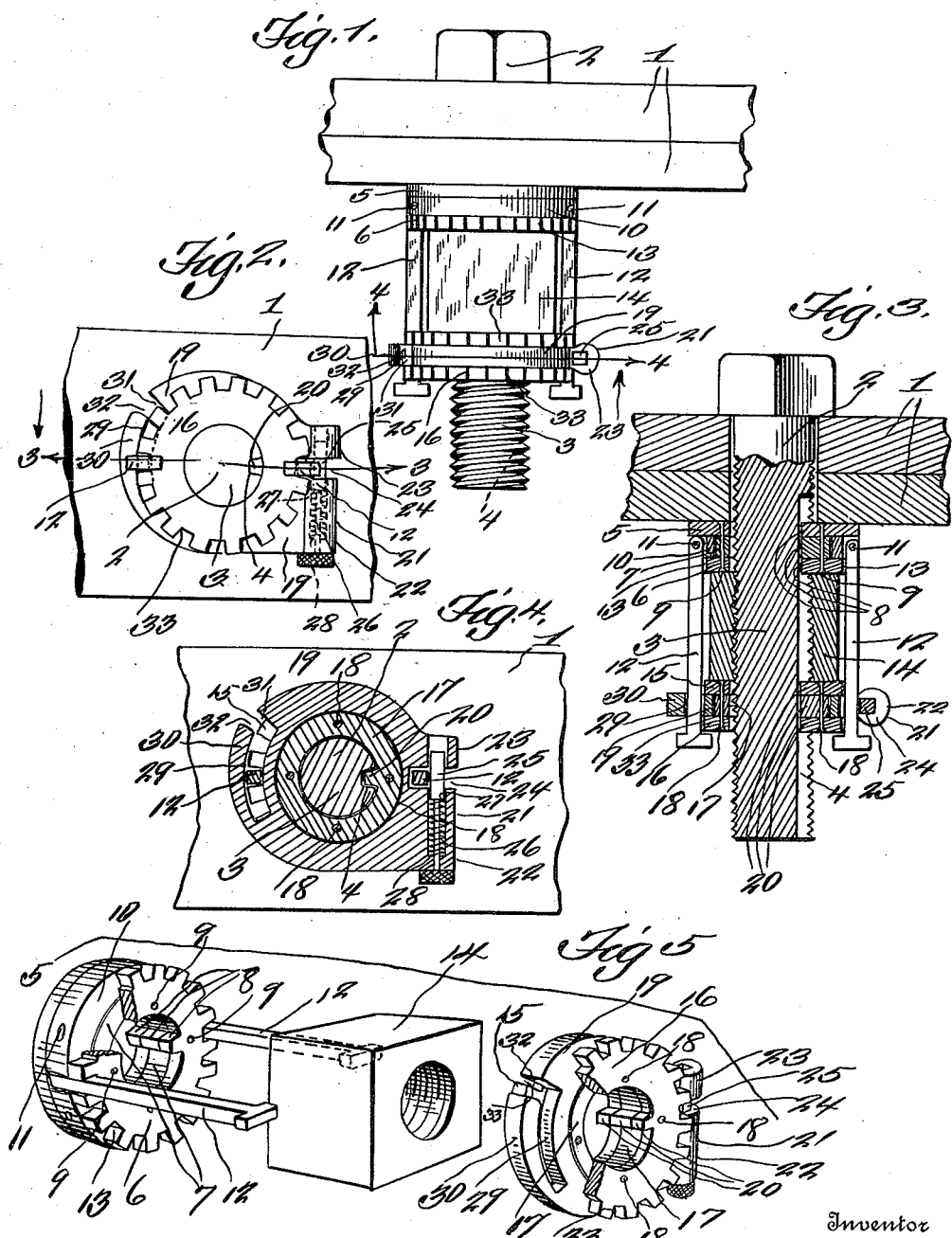

AUGUSTE MARIE LE PIERRE, OF KORBEL, CALIFORNIA.

NUT-LOCK.

1,092,534.  Specification of Letters Patent.  Patented Apr. 7, 1914.

Application filed October 20, 1913. Serial No. 796,278.

*To all whom it may concern:*

Be it known that I, AUGUSTE M. LE PIERRE, a citizen of the United States, residing at Korbel, in the county of Humboldt and State of California, have invented a new and useful Nut-Lock; and I do hereby declare the following to be a full, clear, and exact description of the invention, such as will enable others skilled in the art to which it appertains to make and use the same.

This invention relates to a new and improved nut lock.

One of the objects of the invention is to provide an efficient and practical nut lock, one that will lock the nuts secure, yet may be manually released very easily.

One of the features of the invention, is the provision of a pair of circular rings arranged adjacent the object to be bolted with a third ring swivelly mounted between the first two rings, one of which is provided with notches in its periphery to receive latch bolts. Another pair of rings having notches in its periphery and provided with a plate swiveled between them having a spring tensioned bolt adapted to bridge a recess in said plate to hold one of the first named bolts locked in the notches of the second pair of plates. Said second named swiveled plate having an angular slot and a tongue, which is concentric with the center of the plate to hold the other of the first named bolts in other notches of the second named pair of plates. Said pairs of plates are keyed upon the bolt, one pair between the nut to be locked, and the objects to be bolted, while the other pair of said plates are adjacent the outer face of the nut to be locked.

The invention comprises further features and combination of parts, as hereinafter set forth, shown in the drawings and claimed.

In the drawings:—Figure 1 is a plan view of the nut lock construction embodying the features of the invention. Fig. 2 is a face view of the nut lock. Fig. 3 is a sectional view on line 3—3 of Fig. 2. Fig. 4 is a sectional view on line 4—4 of Fig. 1. Fig. 5 shows the various parts of the entire nut lock construction dis-assembled, said parts being embraced by a bracket Referring more particularly to the drawings, 1 designates two members to be bolted together, while 2 denotes the bolt, the shank 3 of which is provided with a key-way 4. A pair of ring plates 5 and 6 having a third ring plate 7 arranged therebetween, are provided, and adapted to engage the shank of the bolt, the lugs 8 of said ring plates engaging the key-way 4. These ring plates 5, 6 and 7 are riveted together, as shown at 9. Swivelly surrounding the intermediate plate 7 (which as before stated is smaller in diameter than the plates 5 and 6) is a fourth ring plate 10, pivoted to which at 11 are oppositely arranged headed bolts 12, which, when arranged parallel to the shank of the bolt, engage the notches 13 of the plate 6. The nut 14 to be locked is threaded upon the bolt shank adjacent the plate 6. Another pair of plates 15 and 16 circular in contour are riveted together with an intermediate circular plate 17, the rivets of said plates 15 and 16 are denoted by the character 18. The plates 15, 16 and 17 are provided with lugs 20 to engage the key-way 4 of the shank of the bolt.

Swivelly surrounding the plate 17, it being smaller in diameter than the plates 15 and 16, is a circular plate 19. On one side edge of the plate 19 a cylindrical barrel 21 is constructed comprising two parts 22 and 23 alined with one another, there being a recess 24 between the said parts. Mounted in said parts is a spring retained bolt 25, the spring 26 of which acts between the shoulder 27 of the bolt 25 and the shoulder 28 of one of the parts of said barrel. Opposite the recess 24, the plate 19 is provided with a slot 29 and a tongue 30 arranged concentric with the center of the bolt shank, said slot 29 is constructed with an angular portion 31 opening outwardly as at 32. The outer peripheries of the plates 15 and 16 are constructed with notches 33. The plates 15 and 16 together with the swiveled plate 19 are arranged on the shank of the bolt adjacent the nut to be locked. One of the headed bolts 12 engages any two registered notches 33. The plate 19 is then located partially, so that the tongue 30 will overlie the said headed bolt, which also engages the slot 29. The spring retained bolt is then withdrawn sufficiently to permit the other headed bolt to be received in the recess 24, so as to engage another two registering notches 33 of the plates 15 and 16, after which the spring retained bolt is allowed to spring back in place, thereby in this manner locking the nut 14.

The invention having been set forth, what is claimed as new and useful is:—

1. In combination, a bolt having a key-way in its shank, a nut threaded on the shank, a pair of plates having means entering the key-way and mounted on the shank adjacent one side of the nut, a member swiveled between said plates and provided with oppositely arranged pivoted headed bolts, a second pair of plates having peripheral notches and provided with means entering the key-way and mounted on the bolt shank adjacent the other side of the nut, a second member swiveled between the second pair of plates and provided with means for holding the headed bolts in locked engagement with the notches of the second pair of plates.

2. In a nut lock, the combination of a bolt having a nut on the shank thereof, of two pair of plates keyed to the bolt shank, one pair on each side of the nut, a member swiveled between each pair of plates, connections between the swiveled members, and means for locking said connections.

3. In a nut lock, the combination of a bolt having a nut threaded on the shank thereof, of a pair of plates keyed to the shank, a member swiveled between the pair of plates and provided with oppositely arranged pivoted headed bolts, said plates being on one side of the nut, a second pair of plates keyed to the shank having peripheral notches, a second member swiveled between the second pair of plates, the second member having a recess to receive one of the headed bolts to permit it to enter notches of the second pair of plates, a spring retained bolt to bridge the recess to hold said headed bolt in place, said second member having a slot and tongue substantially diametrically opposite the recess to hold the other headed bolt in other notches of the second pair of plates.

In testimony whereof I have signed my name to this specification in the presence of two subscribing witnesses.

AUGUSTE MARIE LE PIERRE.

Witnesses:
 WILLIS E. CHAMBERLAIN,
 HARRY GILMORE.

---

Copies of this patent may be obtained for five cents each, by addressing the "Commissioner of Patents, Washington, D. C."